US008676677B2

(12) United States Patent
    Rothman

(10) Patent No.: US 8,676,677 B2
(45) Date of Patent: Mar. 18, 2014

(54) SYSTEM AND METHOD FOR EXTRACTING VALUE FOR CONSUMERS AND INSTITUTIONS FROM DEPTH OF RELATIONSHIPS

(76) Inventor: Michael Rothman, Hopewell Junction, NY (US)

( * ) Notice: Subject to any disclaimer, the term of this patent is extended or adjusted under 35 U.S.C. 154(b) by 2695 days.

(21) Appl. No.: 10/297,319

(22) PCT Filed: Jun. 5, 2001

(86) PCT No.: PCT/US01/18404
§ 371 (c)(1),
(2), (4) Date: Dec. 4, 2002

(87) PCT Pub. No.: WO01/95062
PCT Pub. Date: Dec. 13, 2001

(65) Prior Publication Data
US 2003/0208438 A1    Nov. 6, 2003

Related U.S. Application Data

(60) Provisional application No. 60/209,542, filed on Jun. 6, 2000.

(51) Int. Cl.
*G06Q 40/00* (2012.01)
(52) U.S. Cl.
USPC .......................................................... 705/35

(58) Field of Classification Search
USPC ............................................................ 705/35
See application file for complete search history.

(56) References Cited

U.S. PATENT DOCUMENTS

| 5,297,026 | A |   | 3/1994  | Hoffman ....................... 364/408 |
| 5,875,437 | A |   | 2/1999  | Atkins ............................ 705/40 |
| 5,933,817 | A |   | 8/1999  | Hucal .............................. 705/39 |
| 5,970,478 | A | * | 10/1999 | Walker et al. ................... 705/35 |
| 5,995,948 | A |   | 11/1999 | Whitford et al. ................ 705/41 |
| 6,016,482 | A |   | 1/2000  | Molinari et al. ................ 705/35 |
| 6,018,721 | A |   | 1/2000  | Aziz et al. ....................... 705/35 |
| 6,049,782 | A | * | 4/2000  | Gottesman et al. ......... 705/36 R |

\* cited by examiner

*Primary Examiner* — Muriel Tinkler
(74) *Attorney, Agent, or Firm* — Sofer & Haroun, LLP

(57) ABSTRACT

A consumer financial transaction system enables a consumer to make transactions via a transaction device. The system has a database storage device for maintaining several databases which are configured to store information corresponding to accounts held by each of the consumers. The server maintains a compute interest pledge module configured to calculate a credit interest rate corresponding to one or more deposit accounts maintained by the consumer, at least of portion of which is pledged by the consumer as a security against the consumer's credit account. In another embodiment, a secondary transaction module is configured to store preferences for apportioning a withdrawal for a transaction between a consumer's credit account and a consumer's deposit accounts.

13 Claims, 9 Drawing Sheets

TRANSACTION TYPE TABLE 700

- RECURRING PAYMENTS
- ONLINE TRANSACTIONS
- TRAVEL EXPENSES
- AUTOMOBILE EXPENSES
- ENTERTAINMENT
- RESTAURANT AND RECREATION
- TRANSACTIONS OF A SPECIFIED $ AMOUNT
- TRANSACTIONS SPECIFIED BY THE LOCATION OF THE MERCHANT
- HOME SUPPLIES
- CASH ADVANCES
- OTHER IDENTIFIABLE RETAIL CATEGORIES (DEPARTMENT STORES, DISCOUNT STORES, FLOWERS STORES, HOBBY STORES, CATALOG MERCHANDISE ETC.)

FIG. 9

SYSTEM AND METHOD FOR EXTRACTING VALUE FOR CONSUMERS AND INSTITUTIONS FROM DEPTH OF RELATIONSHIPS

RELATED APPLICATIONS

This application is related to and claims priority to U.S. Provisional Patent Application No. 60/209,542, filed on Jun. 6, 2000, the entirety of which is incorporated by reference herein.

FIELD OF THE INVENTION

The present invention relates to the field of allowing both consumers and institutions to extract value from a depth of relationship. The present invention also relates to the field of creating a convenient and cost effective manner for consumers to reduce the burden of credit card interest (or other high interest relationships) by taking advantage of financial relationships they may have, such as non-interest (or low interest) bearing deposit (or other) accounts. The present invention also relates to the field of creating a convenient and cost effective manner for institutions to develop long-term, stable, profitable relationships with consumers, by tying consumers to the institution through multiple financial relationships, and thereby providing the consumer with additional value by sharing the greater profit potential and lower risk that multiple relationships yield to the institution.

BACKGROUND OF THE INVENTION

Many consumers are burdened with substantial credit card interest payments. At the same time, they may have balances in their checking accounts which yield little if any interest. The result is that a consumer can be borrowing $1000 for a month from a credit card company at 15% interest, and have $2000 sitting in their checking account yielding 1% interest. This is advantageous for the credit card company that will collect interest on the entire $1000 for the month. It is also advantageous for the bank that holds the checking account, for they get to lend the $2000 at 6%, while paying only 1%. However, it is not in the consumer's best interest. Further, the consumer may have other financial relationships that should significantly reduce any risk that a credit card issuer faces. These other relationships, which ameliorate risk, are generally not considered in fixing rates for the credit card debt.

Also, institutions have to invest large sums in trying to retain consumers and in replacing consumers that close their accounts. Further, institutions tend to compute profitability by account, rather than by consumer. This leads them to emphasize instruments, which may yield high profit (such as credit cards) and therefore to compete with other institutions for this high profit business rather than for the profitability in the entire consumer relationship.

The success of mono-line institutions (e.g. banks that only issue credit cards) is the result of institutions competing instrument by instrument.

SUMMARY OF THE INVENTION

One object of the present invention is to overcome the drawbacks to consumers in the existing system; that consumers may have deposits earning little interest, at the same time they are paying high interest rates on credit card debt, and that credit card interest rates are generally fixed independent of other financial relationships a consumer may have that would ameliorate a portion of the otherwise assumed risk.

Another object of the invention is to give the consumer a new type of financial tool with which to regulate his cash flow.

Another object of the invention is to detail a system and method for combining the functions of the credit card and the debit card.

According to another embodiment of the invention, a set of rules is described whereby the consumer may specify how his transactions are to be processed.

According to another embodiment of the invention, the types of transaction choices are described.

According to another embodiment of the invention, the relationship between other financial relationships, perceived risk, and therefore appropriate credit card type interest rates is established.

According to another embodiment of the invention, the idea of variable credit card type interest rates as a function of balances in deposit (or other) accounts maintained by the consumer is established.

According to another embodiment of the invention, the idea of variable credit card type interest rates as a function of the number of other relationships a consumer has with a Bank (or similar institution) is established.

According to another embodiment of the invention, the regular notification to the consumer of both credit card type and other deposit balances for the purpose of informing him as to the current rate of interest they are incurring on their credit card type debt is established.

According to another embodiment of the invention, the regular notification to the consumer informing him as to how his purchases have been allocated between credit and deposit accounts.

Other objects and advantages exist for the present invention.

To this end, in one embodiment of the present invention, a consumer financial transaction system is provided by a lending institution enabling a consumer to make transactions via a transaction device. The system is comprised of a database storage device for maintaining several databases which are configured to store information corresponding to accounts held by each of the consumers. A server is also provided which maintains a compute interest qualify module configured to calculate a credit interest rate corresponding to the number of accounts maintained by the consumer.

In one embodiment of the present invention, the several databases include a customer financial relationship database configured to store all of the consumer's accounts, an institutional parameters database, configured to store criteria used for determining which of the accounts are treated as qualifying accounts and a qualifying accounts database configured to store a listing of all of the consumer's accounts which qualify to lower the consumer's credit interest rate.

In another embodiment of the present invention, the server maintains a compute qualify module which is configured to determine which accounts qualify to lower the consumer's credit interest rate and a compute credit line module configured to compute the consumer's credit limit and base interest rate.

In another embodiment of the present invention the transaction device is a credit card.

In another embodiment of the present invention, a consumer financial transaction system provided enabling a consumer to make transactions via a transaction device. The system is comprised of a database storage device for maintaining several databases configured to store information corresponding to accounts held by each of the consumers with the lending institution. Additionally, a server is provided which maintaining a compute interest pledge module configured to calculate a credit interest rate corresponding to the number of accounts maintained by the consumer pledged by the consumer as security against the consumer's credit account. The server can also be configured to adjust the consumers credit limit in an amount corresponding to the number of accounts maintained by each consumer pledged by the consumer as security against the consumer's credit account.

In another embodiment of the present invention, the databases are comprised of a customer financial relationship database configured to store information pertaining to all of the consumer's accounts. with a means to denote a stored account as an account pledged in security of the consumer's credit account.

In another embodiment of the present invention, the server maintains a compute credit line module configured to compute the consumer's credit limit and base interest rate.

In another embodiment of the present invention, a consumer financial transaction system is provided enabling a consumer to make transactions via a transaction device The system comprises a database storage device for maintaining several databases configured to store information corresponding to accounts held by each of said consumers. A server is also provided which maintains a secondary transaction module configured to apportion a withdrawal for a transaction between a consumer's credit account and any one of the consumer's deposit accounts.

In another embodiment of the present invention, the databases are comprised of a merchant customer code group database configured to store information related to merchant customer codes, used to identify transactions by type of merchant, a consumer financial relationship database configured to provide to the secondary transaction module a listing of all of the consumer's accounts and a consumer financial preferences database configured to store consumer preferences pertaining to how a consumer wishes apportion a withdrawal for a transaction between the consumer's credit accounts and any one of the consumer's deposit accounts.

In another embodiment of the present invention, the server has an allocation module configured to cross reference an incoming transaction's merchant customer code against the merchant customer code database to properly identify the type of incoming transaction so as to provide the secondary transaction module the necessary information to process the transaction.

In another embodiment of the present invention, a consumer financial transaction method is provided enabling a consumer to make transactions via a transaction device for use on a system. This steps in this method include computing a credit line for determining the consumer's credit limit, determining the number of qualifying accounts held by the consumer which are considered by the lending institution when determining the consumer's credit interest rates, and reducing the consumer's credit interest rate based on the qualifying accounts.

In another embodiment of the present invention the method provided further included the steps of accessing said consumer's accounts at, accessing institution parameters used to determine which of the user's other accounts qualify to reduce the credit interest rate for consumer's account, computing the number of qualifying accounts, storing the qualifying account information into a qualifying accounts database and calculating a reduced credit interest rate for a consumer's credit account corresponding to the number and type of qualifying accounts as stored in qualifying account database.

In another embodiment of the present invention, a consumer financial transaction method is provided enabling a consumer to make transactions via a transaction device for use on a system. The steps include computing a credit line for determining the consumer's credit limit, determining the number of pledged that are considered by the lending institution when determining the consumer's credit interest rates, and reducing the consumer's credit interest rate based on the pledged accounts.

In another embodiment of the present invention the method also includes the steps of, determining the number of pledged accounts that are considered by the lending institution when determining the consumer's credit limit and increasing the consumer's credit limit based on the pledged accounts.

In another embodiment of the present invention the method also includes the steps of accessing said consumer's accounts, computing the number of pledged accounts, storing the pledged accounts into a customer financial relationship database, and calculating a reduced credit interest rate for a consumer's credit account corresponding to the number and type of pledged accounts as listed in the customer financial relationship database.

In another embodiment of the present invention, the-method also includes the step of calculating an increased credit limit for a consumer's credit account corresponding to the number and type of pledged accounts as listed in said customer financial relationship database.

In another embodiment of the present invention, a consumer financial transaction method is provided enabling a consumer to make transactions via a transaction device for use on a system. The method includes the steps of storing the consumer preferences regarding how the system apportions a withdrawal for transactions between a consumer's credit accounts and deposit accounts and allocating the withdrawals for the transactions between the consumer's credit and deposit accounts in accordance with the stored consumer preferences.

In another embodiment of the present invention, the method also includes the steps of checking a consumer account for validity and accessing the consumer's account preferences comprised of, minimum deposit account balance, credit account balance, credit card maximum, and allocation percentages between said consumer's deposit and credit accounts.

In another embodiment of the present invention includes, the method further includes the steps of allocating against the consumer's deposit account a withdrawal amount for the transaction determined by the consumer's stored allocation percentage preferences and determining the consumer's available credit and allocating a withdrawal against the consumer's credit account the remaining withdrawal amount of the transaction cost if the available credit is sufficient, or rejecting transaction if the credit limit is insufficient to cover the withdrawal amount in excess of the withdrawal amount allocated against the consumer's deposit account.

BRIEF DESCRIPTION OF THE DRAWINGS

FIG. 9 is a table illustrating the possible transactions that can be specified is by a user for special treatment, according to one embodiment of the present invention.

DETAILED DESCRIPTION OF THE PREFERRED EMBODIMENTS

In one embodiment of the present invention, a system and method for combining the functions of credit and debit cards allowing for more flexibility for the consumer, is provided. Further, the present invention may be used to allow consumers to have their entire financial situation taken into account in the determination of interest rates for credit card type debt. Also, the present invention is a powerful tool for banks or other multi-line establishments to tie consumers closely to their institution and therefore prevent consumer attrition. Nonetheless, the characteristics and parameters pertaining to the systems and methods are equally applicable to other systems and methods for combining financial transaction types into a single flexible consumer-friendly approach.

It should be noted that deposit and checking accounts are often used interchangeably both of which denote accounts held by a consumer which maintain a balance that can be used against purchases made by the consumer. It is understood that the features claimed in the present invention which are directed to a checking account are equally applicable to deposit accounts and vise versa.

Figure 1:
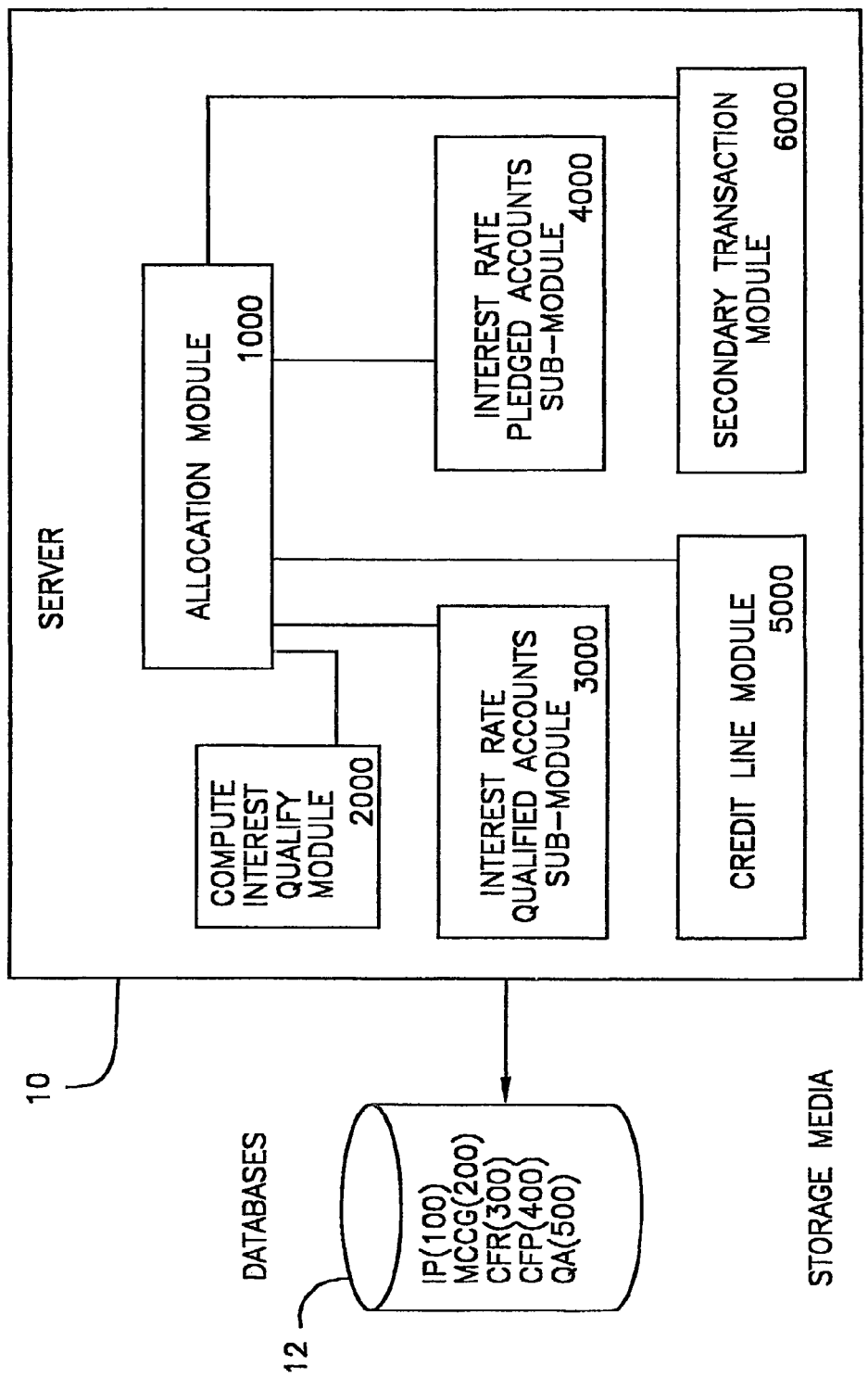
FIG. 1 illustrates an exemplary system employed, according to one embodiment of the present invention.

The system employed in accordance with one embodiment of the invention is illustrated in FIG. 1. A server 10 is coupled with a database storage device 12 to conduct all the necessary calculations and account maintenance. Database storage device 12, among other things, includes databases which are used for retrieving and storing data.

The institutional parameter database (100) (IPDB) is used to maintain the parameters which set the requirements for a given account to qualify for beneficial rate adjustments. The merchant category code group database (200) (MCCGDB) maintains a table relating groups of merchant category codes to the types of transaction consumers can select for special allocation. For example:

a. Type="Cash advance" equates to MCC=6010, 6011, or 6012.
b. Type="Grocery" equates to MCC=5400-5499.
c. Type="Restaurants" equates to MCC=5812-5814.
d. Type="Recurring payments" can have any MCC, but requires that the "recurring payment" flag on the transaction be set to ON.
e. Type="High dollar expenses" can have any MCC, but requires that the transaction amount be $1000.00 or more.

Along with the table are rules for their sequence of application, such as, first rules which specify merchant category code (rules "a", "b", and "c" above), then rules based on flags (rule "d" above), and finally rules based on amount (rule "e" above). The merchant category code system is an accepted industry wide standard for categorizing and identifying merchants by their products and services. At the point of sale, a merchant category code is attached to the transaction so that the institutions which track and ultimately settle the transactions will be informed of the type of goods and services provided for that particular transaction.

The customer financial relationship database (300) (CFRDB) provides a list of accounts and account balances for each consumer. Also maintained in this database are the dates on which the given accounts were opened and status indicators for each account. The customer financial relationship database 300 also provide a notation next to pledged accounts, as discussed in more detail below.

The customer financial preference database (400) (CFBDB) maintains a listing of the minimum amount for each deposit account so as to prevent any withdrawals that would reduce the account below a specific amount. Database 400 also maintains a listing of the types of transactions, such as "cash advance" for allocation to each account. Additionally, database 400 maintains tables that display the percentages of transactions by type for each account, such as percentage allocations between deposit and credit accounts. For example, database 400 will store the necessary data if a user wishes for a particular transaction type such as grocery purchases to be allocated 50% to deposit and 50% to credit. A more detailed description of the operation of the card and the operation of the above described databases is discussed below.

Qualifying accounts database (500) (QADB) maintains a table of all accounts that qualify for a beneficial reduced credit interest rate.

In another embodiment of the present invention, as illustrated in FIG. 1, server 12 maintains several physical modules responsible for performing various functions in the system. The allocation module (1000) allocates and apportions transactions to the appropriate account. The compute interest/qualify module (2000) computes interest charges to the various accounts as a function of the number of qualifying accounts. The compute qualify module (3000) determines the number of qualifying accounts. The compute interest pledge module (4000) computes interest charges as a function of the pledge assets. The compute credit line module (5000) computes the credit line and base interest rates. A secondary transaction module (6000) is also provided which functions as the primary module that carries out the account holder purchase transactions. It should be noted that compute qualify module 3000, compute interest qualify module 2000, compute interest pledge module 4000 are depicted as separate modules to better illustrates the various operations that need to occur when re-calculating the credit interest for a consumer. However, various combinations of these physical modules may be employed which subsume the functions of one another and consolidate the necessary calculations into a single module so long as the all of the basic functions are still performed, such a counting qualified accounts etc. For example, the function of compute qualify module 3000, compute interest qualify module 2000 and compute interest pledge module 4000 could be re-configured to occur within a single interest rate estimator module so long as the functions of the compute qualify module 3000, the compute interest qualify module 2000, and the compute interest pledge module 4000 are not compromised.

Figure 6:
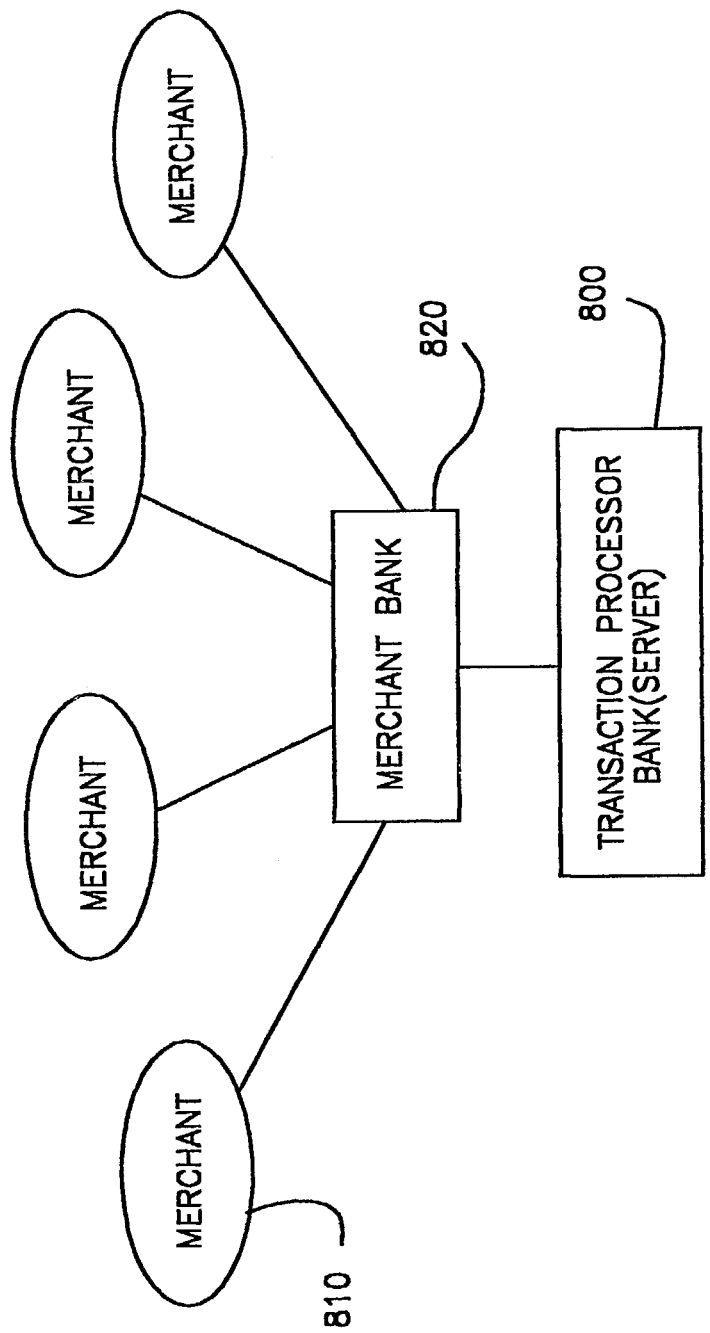
FIG. 6 illustrates a flow chart representation of the operation of a secondary transaction network employing the system, according to one embodiment of the present invention.

In one embodiment of the present invention, as illustrated in FIG. 6, this system is employed by the lending institution 800. Lending institution 800 that maintains the consumer accounts via the system can issue a card or other transaction device to be used by the consumer in order conduct transactions at any number of merchants 810. It should be noted that transaction device can include any device used by a consumer to carry our a transaction such as a debit card, a credit card, a smart card etc. When a user makes a purchase or conducts any other transaction with merchants 810, the transaction is referred to the merchant bank 820 for that particular merchant 810. Merchant bank 820 then communicates with the account holder lending institution 800 (via the Visa Network, for example) After the transaction is processed the lending institution 800 then adjusts the consumer's account, as stored in the system, in accordance with the procedure outline below.

Figure 2:
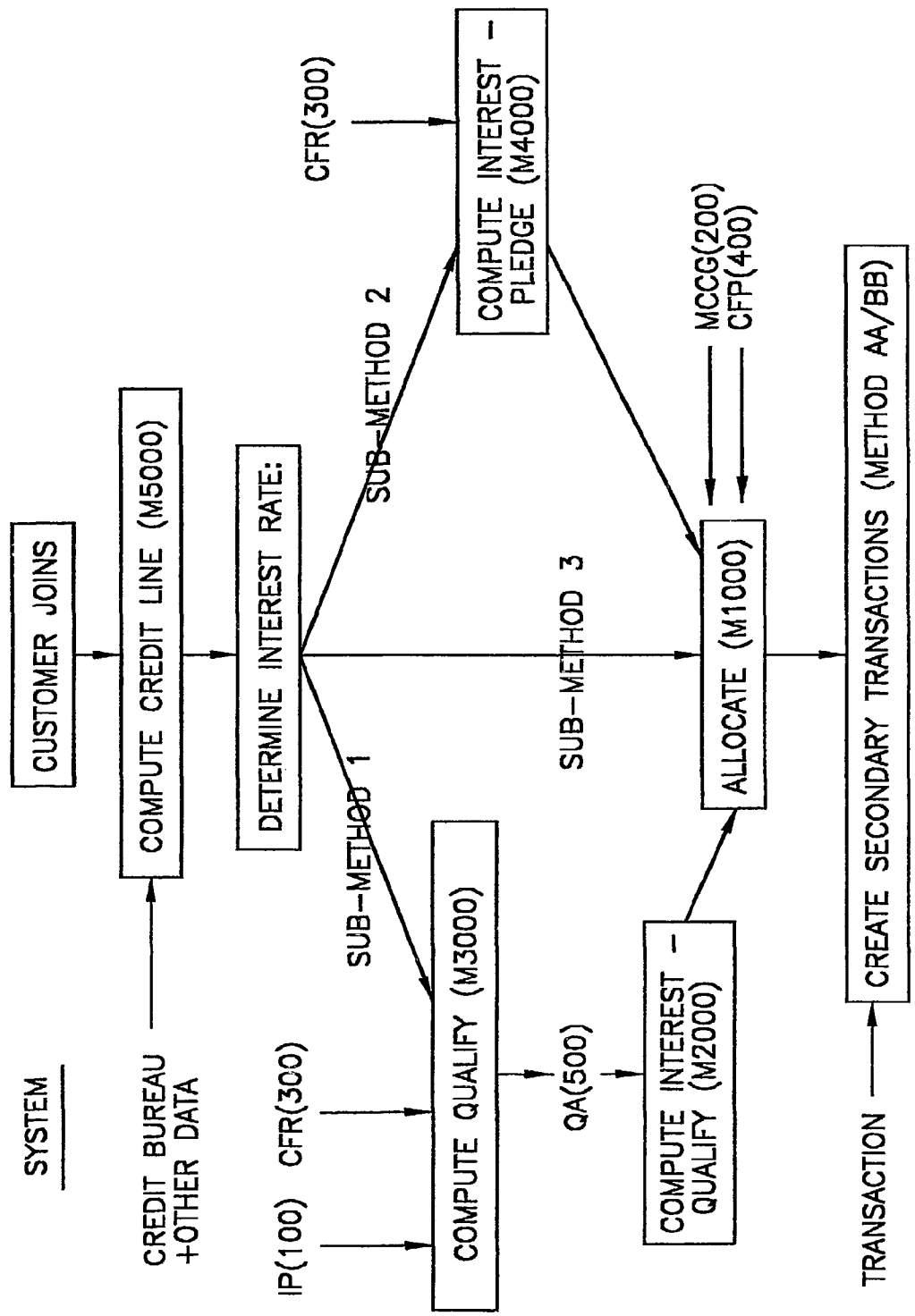
FIG. 2 illustrates a flow chart representation of the operation of a credit rate adjustment system employed, according to one embodiment of the present invention.

In one embodiment of the present invention, as illustrated in FIG. 2, when a consumer first joins the system, compute credit line module 5000 is called to determine credit line and interest rates without consideration of either other qualifying accounts, or pledged assets. External data is accessed to determine creditworthiness.

In one embodiment of the present invention (sub-method 1, multiple qualifying account function), as illustrated in FIG. 2, if a consumer has other qualifying accounts with the institution then compute qualify module 3000 is called to determine the number of qualifying accounts. Compute qualify module 3000 accesses the institutional parameter database 100 for institutional parameters and the customer financial relationship database 300 for consumer financial relationship information. The result is placed in the qualifying accounts database 500. A qualifying account is any account maintained at the same institution, which that institution feels adds stability and creditworthiness to the user based on the amounts, duration and other features of those accounts. Compute interest qualify module 2000 is then called on to compute the interest rate and credit line available to the new consumer. An agreement is made that the closure or conversion to "non-qualifying" of qualifying accounts will result in an increase in interest rate and possibly required pay-down of outstanding balances on the credit line.

For example, if the consumer has a credit card type account only, the interest rate may be 15% per annum. If the consumer has a checking account in addition, the interest rate may be 13%. If there is a home equity loan as well, the rate may be 11%. If there is a mortgage as well, the rate may be reduced to 9%, and so on. The rate may have a floor at a value, which provides a minimum basic profit to the institution. In fact, the institution may elect to lower the rate below the profitable level, if it is judged that the other relationships that the consumer had to establish with the institution are producing a sufficient level of profitability. This feature will allow multi-line institutions to take advantage of the depth of relationship that they have with a consumer to: a.) maintain a level of profitability for each consumer relationship, b.) to create long-term relationships with consumers and thereby eliminate excess expenses that result from consumer attrition, c.) to allow the consumer the benefit from the reduced risk and lower maintenance costs inherent in the depth of his relationships with an institution.

Furthermore, in accordance with another embodiment of the present invention, a consumer's interest rates that are lowered by the existence of other qualifying accounts held at the same institution may vary in multiple stages as a function of the dollar amount of the qualifying account. For example, if the consumer's credit is extended beyond the dollar amounts held in the qualifying accounts, the credit interest rate may be returned to the standard credit interest rate for the amount in excess of the qualifying accounts.

In another embodiment of the invention (sub-method 2, pledge function), as illustrated in FIG. 2, if a consumer has other deposit accounts with the institution, such as CD's (Certificates of Deposit) then compute interest pledge module 4000 is called upon to compute interest rate as a function of pledged assets. The results are stored in customer financial relationship database 300 as either a notation or some other operation device which allows the system to recognize the account as a pledged account. A pledge asset is a deposit account held by the consumer at the same institution that is pledged as additional security against their credit line in order to achieve a; 1) a lower credit interest rate; 2) extended credit limits or some combination of the two. For example, in one embodiment of the invention, the blend card account holder who also maintains a CD (Certificate of Deposit) at the same institution, would be allowed to borrow 90% of their pledged balance on the blend card account at a "secured" (lower) interest rate. Any amount they borrowed over that amount would be charged at the "unsecured" (higher or standard) interest rate.

Compute interest pledge module 4000 accesses the customer financial relationship database 300. An agreement is made with the consumer that the withdrawal of assets pledged must first be applied to the reduction of any debt that would exceed the credit line that the consumer would qualify for without that pledged asset. For example, if a consumer would independently qualify for $1000 of credit and pledges $5000 of assets, then his credit line would be $6000. There would be no restrictions if he charged $1000 and then decided to close the deposit account. However, if he had charged $3000 and wanted to withdraw $5000 from his deposit account, the first $2000 would be used to reduce the debt to $1000.

As such, if the consumer agrees that monies from the deposit account are committed or pledged to cover the debt in the credit card type of account, then risk is reduced dramatically (it becomes a secured versus an unsecured loan) and the necessary interest rate to be charged may be similarly reduced, commensurate with the lowered risk.

It should be noted that, although pledged deposit accounts provide greater incentive for a lender to lower their interest rates, if the consumer has a deposit account with the Bank (or other institution), but does not specifically commit or pledge funds from the deposit account to cover the credit card type debt, risk may still be considered to have been reduced (although not to the level of a secured or pledged loan), and interest rates charged reduced commensurately in accordance with sub-method 1 for basic qualifying accounts.

Re-computation of interest due using either method (compute interest qualify module 2000 or compute interest pledge module 4000) would be done on a daily basis.

In another embodiment of the present invention the interest rate charged is simply fixed at the time an account is opened (sub-method 3).

Figure 3:
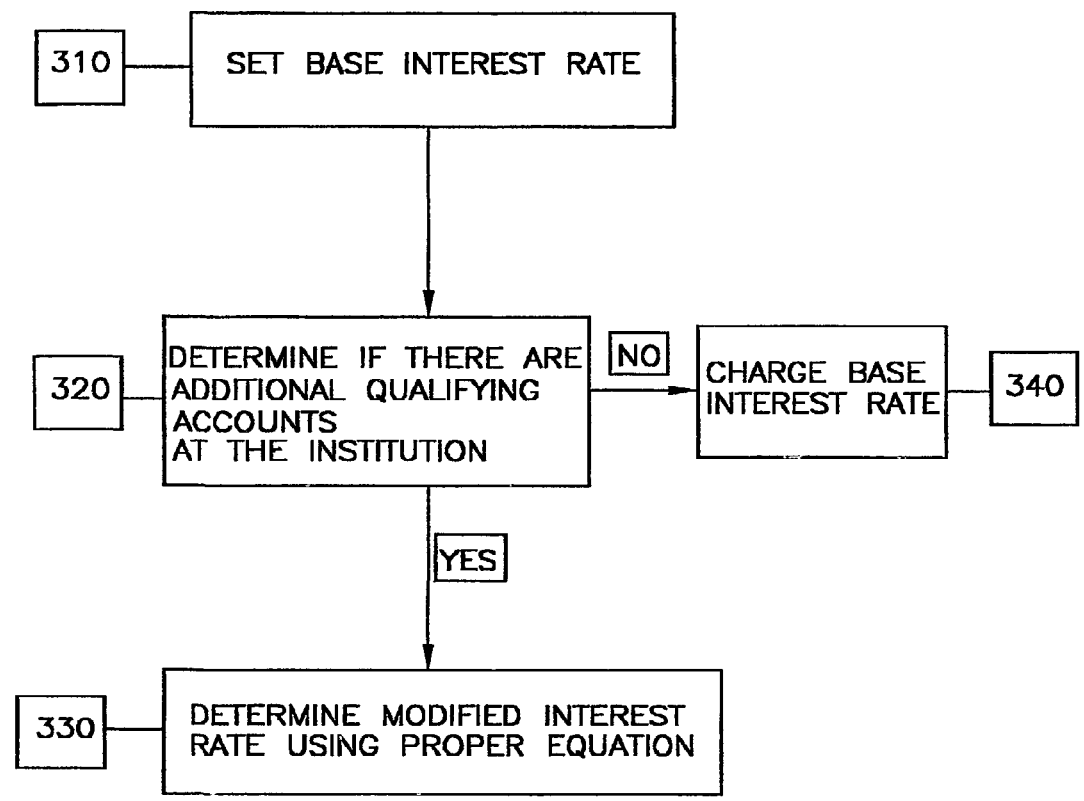
FIG. 3 illustrates a flow chart representation of the operation of a credit rate adjustment system employed, according to one embodiment of the present invention.

To calculate the user's interest rate under the sub-method 1 qualified account function, as illustrated in FIG. 3, at step 310, a standard interest rate X % is applied to the account by compute interest qualify module 2000. Next, at step 320, module 2000, looks to customer financial relationship database 300 to determine if the account holder maintains any additional qualifying account with the institution. If not, the standard interest rate X % is charged at step 340. However, if the consumer has additional qualifying accounts then, at step 330, the interest charged is calculated using the general equation:

$$X\% - N*(Y\%) = \text{interest charged}$$

X %=standard interest, Y %=a percent calculated by the bank, and N=the number of qualifying accounts held by the consumer at the bank.

This equation is in no way intended to limit the scope of the possible methods to charge interest on these accounts, but is simply intended to illustrate that consumers who maintain multiple qualifying account with the bank will receive a beneficial interest rate. For example, qualifying accounts can be characterized in many different ways by the bank, such as a weighting system favoring consumers who have had qualifying accounts at the institution for greater amounts of time. Any such calculation that beneficially modifies a consumers credit interest rate based on their additional deposit accounts maintained at the same institution is within the contemplation of this invention.

Figure 4:
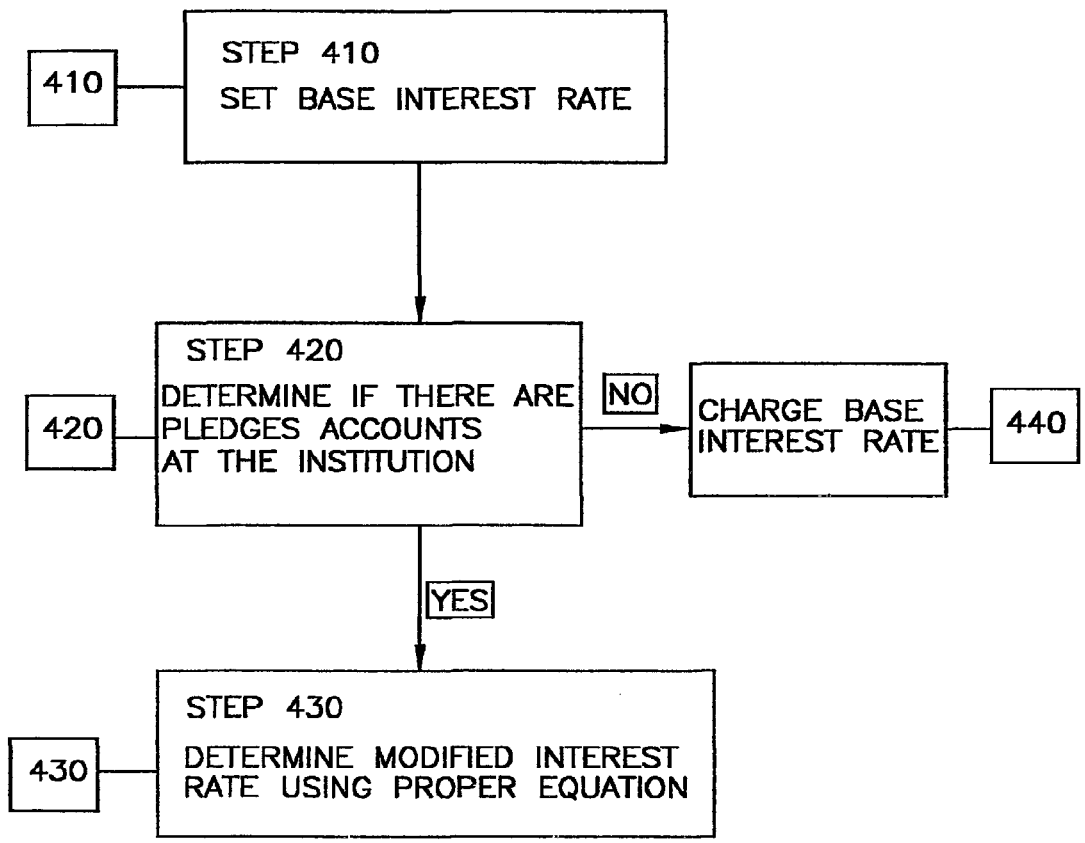
FIG. 4 illustrates a flow chart representation of the operation of a credit rate adjustment system employed, according to one embodiment of the present invention.

To calculate the user's credit interest rate under sub-method 2 pledge feature, as illustrated in FIG. 4, at step 410, a standard interest rate X % is applied to the account by compute interest pledge module 4000. Next, at step 420, module 4000, looks to customer financial relationship database 300 to determine if the account holder maintains any additional qualifying deposit accounts with the institution that the user has pledged as security against their debt accounts. If not, the standard interest rate X % is charged at step 440. However, if the consumer has additional qualifying accounts that have been pledged then, at step 430, the interest charged is calculated using the general equations:

If $M >= N$, then total interest owed is: $(X-Y)\%*N$

If $N > M$, then total interest owed is: $((X-Y)\%*M)+(X)\%*(N-M)$

Where M=amount pledged, N=amount of debt, X=standard interest rate (i.e. that rate charged independent of pledged assets), and Y=the reduction in standard rate qualified for by the pledged assets (the secured rate benefit).

This equation is in no way intended to limit the scope of the possible methods to charge interest on these accounts, but is simply intended to illustrate that consumers who pledge other deposit accounts against their credit accounts with the bank will receive a beneficial interest rate.

Figure 5:
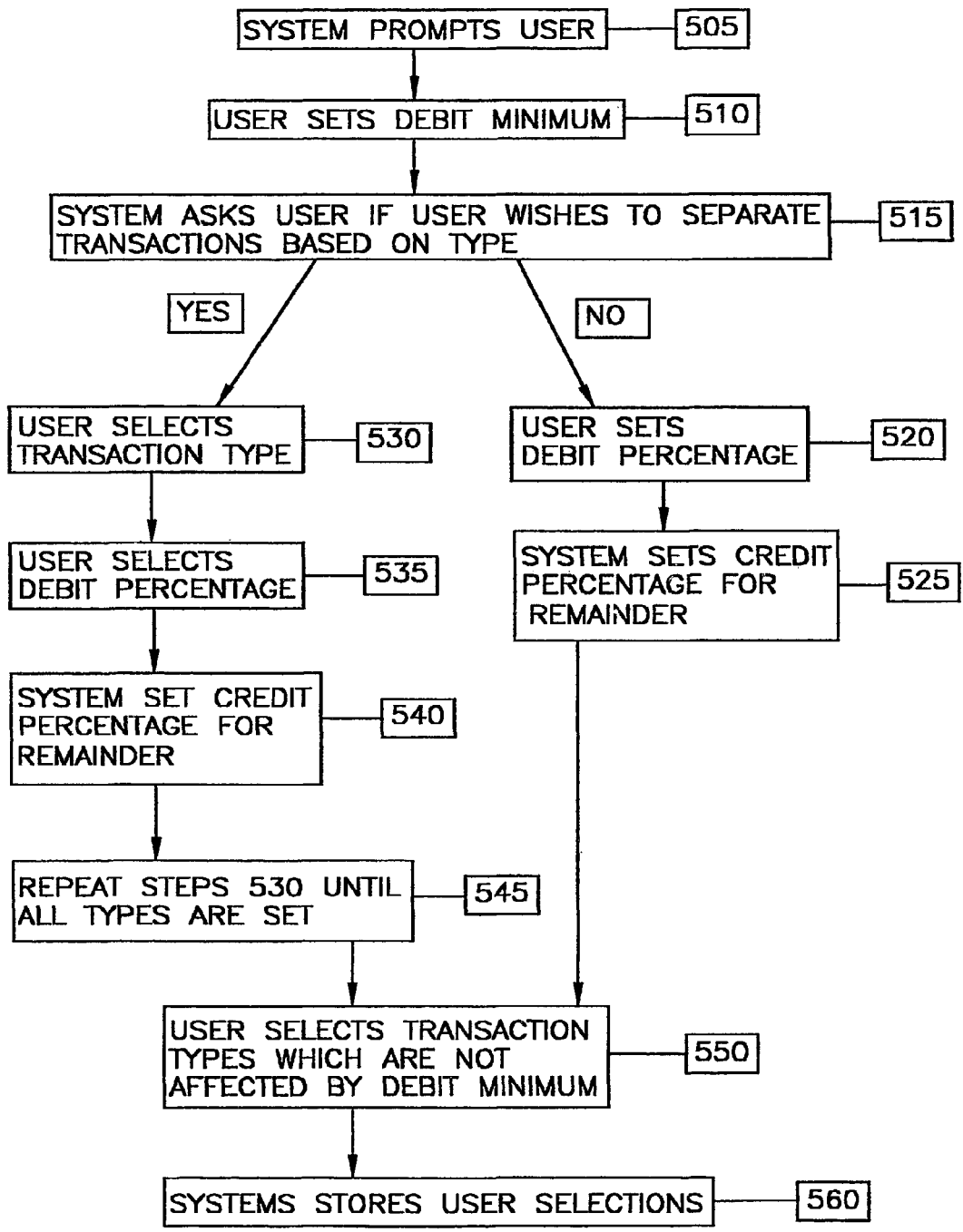
FIG. 5 is a flow chart representation of entering consumer preferences into the system according to one embodiment of the present invention.

In another embodiment of the invention, the consumer's preferences for allocating his transactions would be recorded and entered into customer financial preferences database 400. As illustrated in FIG. 5, at step 505, the system prompts the consumer with questions concerning their account and how they wish for the transactions to be allocated against both their credit and deposit accounts. For example; "How will automatic payments be made, credit or debit?"; or "How will cash advances be paid, credit or debit?" The selections made by the user at this step will set the default parameters for how the user's account will be charged for basic transactions. In another example, when the consumer sets up the blend card account, they would be asked four questions; (a) "would you prefer credit or deposit for groceries?;" (b) "would you prefer credit or deposit for cash advances?;" (c) "would you prefer credit or deposit for travel?;" and (d) "would you prefer credit or deposit for recurring payments?."

At step 510, the user sets the minimum amount for their checking account, such that all transactions that would put the checking account below the set minimum will have the excess amount automatically transferred to the credit account irrespective of all default allocation percentages and the allocation percentages discussed below.

Next, at step 515, the user selects if they would like to allocate their credit vs. deposit percentages based on individual transaction types such as those listed in table 700 in FIG. 9, or if they would like the percentages applied equally for all transaction types. If the user would like the same percentages used for all transaction types, then at step 520, the user specifies the percentage that will be applicable to the deposit account. At step 525, the system sets the remaining percentage to be applied to the users credit.

If the user had determined that they would like the percentages varied as function of the transaction type, then, at step 530 the user selects a transaction type from table 700 in FIG. 9. After selecting a transaction type, at step 535, the user allocates a percentage of each transaction of that type that will be applied to the deposit account. Next, at step 540, the system allocates the remaining percentage of the transaction for that type to be drawn from the user's credit. At step 545, the user repeats steps 530-540 until all desired transaction types that the user desires to be allocated differently than their default percentages are accounted for. In operation, when a blend account card is used for a purchase the incoming transaction will have a merchant category code associated therewith. Upon cross-referencing with merchant category code group database 200, the system will be able to identify the type of incoming transaction and apply the appropriate percentages of credit and deposit to a particular transaction.

Irrespective of whether the user selected yes or no as to whether or not to allocate specific credit and deposit percentages based on particular types of transactions, at step 550, the user is then afforded the opportunity to allocate as many transaction types from table 700 as they wish, where the checking account minimum set in step 510 will not be adhered to. For example, if a merchant category code is registered grocery, the user may wish that regardless of the set deposit minimum, the entire transaction will be charged to the deposit account until it is empty. Finally, in step 560, the system saves the user's selections in the customer financial preferences database 400.

In general, when a transaction arrives via the network (for example the VISA network), as illustrated in FIGS. 2 and 6, allocate module 1000 is called upon to allocate that transaction to the appropriate account. Allocate module 1000 accesses the merchant category code group database 200 to determine the type of transaction. Then customer financial preference database 400 would be accessed so that allocate module 1000 will apply the consumer-specified rules to determine what secondary transactions should be generated. For example, if a transaction arrives of merchant category code 5812, allocate module 1000 accesses the merchant category code group database 200 and determines that this is a grocery transaction. It then accesses customer financial preferences database 400 to see what the consumer has chosen for allocation for this type of transaction if it is different than their default setting (e.g. 50% credit, 50% debit). The system then generates two secondary transactions, following one of the methods described below in FIG. 7 or FIG. 8.

Figure 7:
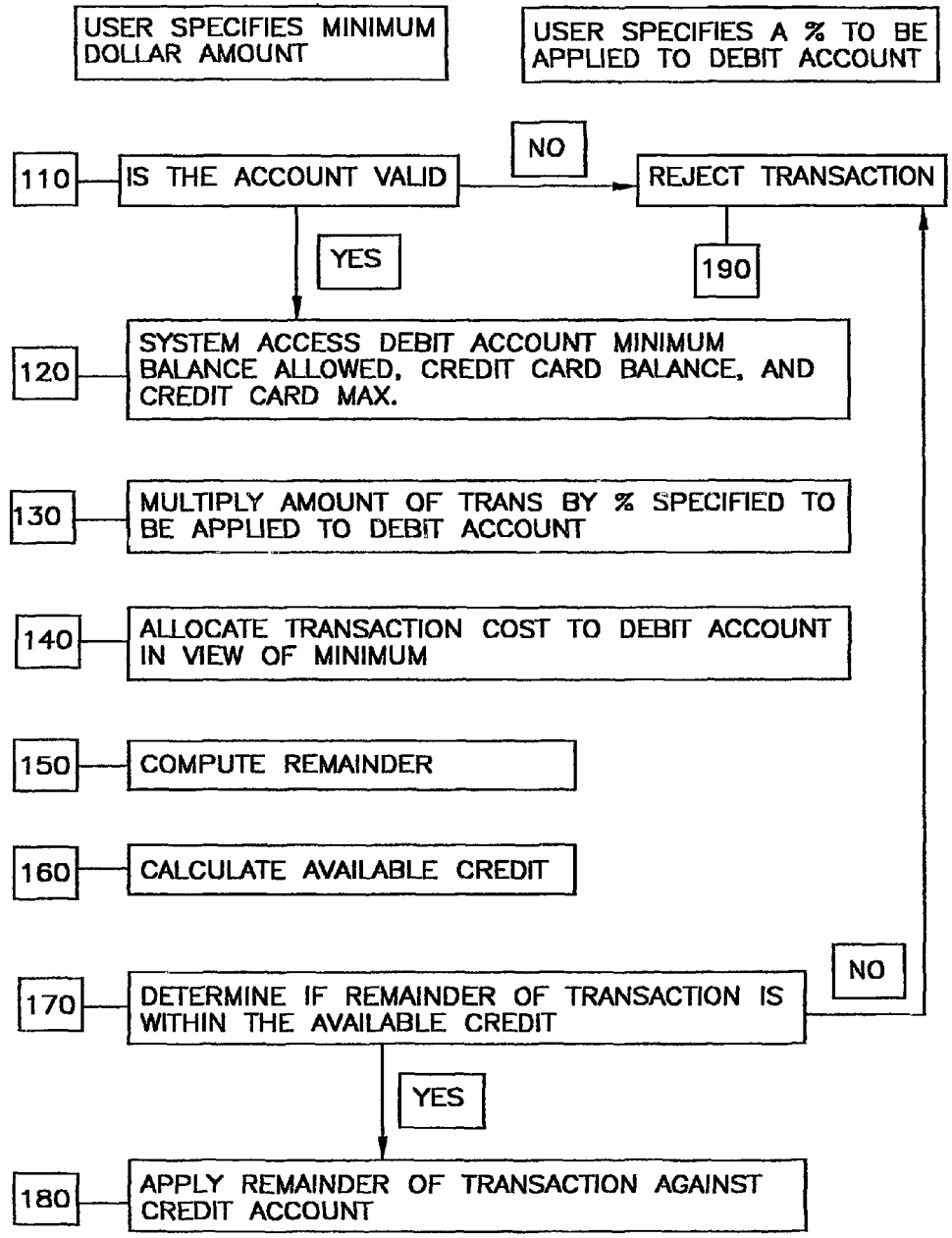
FIG. 7 illustrates a flow chart representation of the operation of a blend account in the system employed, according to one embodiment of the present invention.

In one embodiment of the present invention, as illustrated in FIG. 7, where the consumer specified two parameters, as stored in the customer financial preferences database 400: the size of the balance that they wants to retain as a minimum in his checking account, and the percentage of cash (deposits) they would like to use in each purchase.

In a transaction operation, as illustrated in FIG. 7, at a first step 110, the secondary transaction module 6000 verifies that the consumer has a valid account, if not the transaction is rejected at step 190. Next at step 120, secondary transaction module 6000 retrieves data from customer financial preferences database 400 to obtain information such as, the checking account minimum allowed balance, credit card balance, and credit card maximum. At step 130, secondary transaction module 6000 multiplies the amount of the transaction by a percentage amount specified to be applied to the deposit account. This percentage can be anywhere between 0% and 100% as determined by the user's preference.

Next at step 140, secondary transaction module 6000, allocate the percentage amount of the transaction to the deposit account. At step 150, the remainder that is to be applied to the credit account, is computed. At step 160, the available credit is computed.

Next, at step 170, secondary transaction module 6000, determines if the available credit is enough to cover the remaining amount of the transaction. If not, the entire transaction is rejected at step 190. If there is sufficient credit to cover the remainder of the transaction then at step 180, secondary transaction module applies the remainder of the transaction amount to the user's credit account.

Figure 8:
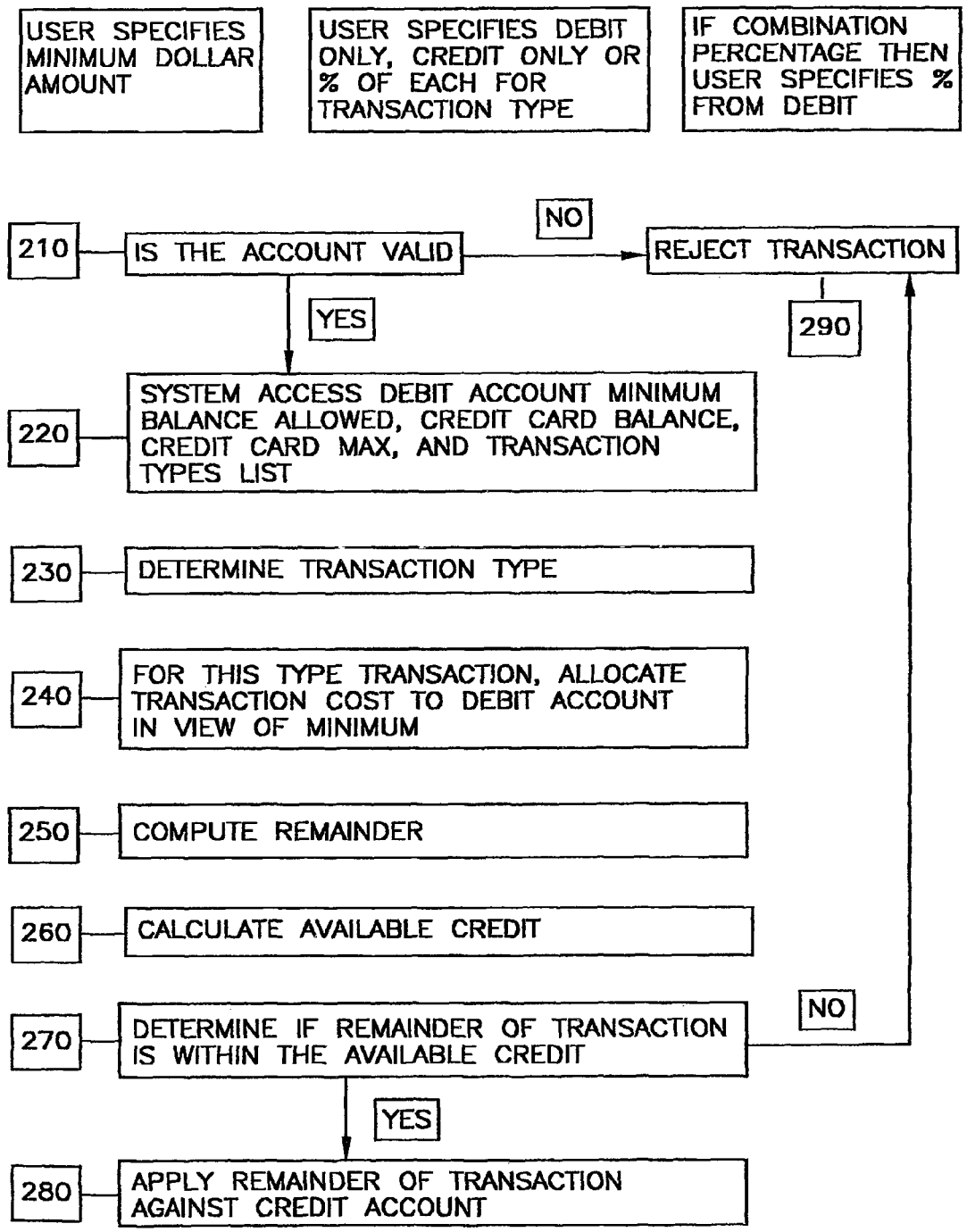
FIG. 8 illustrates a flow chart representation of the operation of a blend account in the system employed, according to one embodiment of the present invention.

In another embodiment, as illustrated in FIG. 8, the consumer specifies which types of purchases are either: credit only, deposit only, or a combination of credit and deposit for specific types of transactions. Transaction type table 700, as illustrated in FIG. 9, lists several types of transactions that a user can distinguish between when selecting their preferred method of payment as described above in steps 530-545. For those types of purchases, which are to be covered by a combination of credit and debit, the percentage of the transaction to be applied to credit will be specified by type of purchase, by the consumer.

In a transaction operation, as illustrated in FIG. 8, at a first step 210, the secondary transaction module 6000 verifies that the consumer has a valid account, if not the transaction is rejected at step 290. Next, at step 220, secondary transaction module 6000 retrieves data from customer financial preferences database 400 to obtain information such as, the deposit account minimum allowed balance, credit card balance, credit card maximum, and specialized transaction types. At step 230, secondary transaction module 6000 determines the transaction type by cross referencing the merchant category code number for the transaction against merchant category code group database 200.

At step 240, secondary transaction module 6000 multiplies the amount of the transaction by a percentage amount specified to be applied to the deposit account for this particular type of transaction and allocates it against the deposit account. This percentage can be anywhere between 0% and 100% as determined by the user's preference. At step 250, the remainder, which is to be applied to the credit account, is computed. At step 260, the available credit is computed, as explained before in FIG. 5.

Next, at step 270, secondary transaction module 6000, determines if the available credit is enough to cover the remaining amount of the transaction. If not, the entire transaction is rejected at step 290. If there is sufficient credit to cover the remainder of the transaction then at step 280, secondary transaction module applies the remainder of the transaction amount to the user's credit account.

In accordance with another embodiment of the present invention the consumer, when specifying the types of transactions as either credit or debit, as described above in FIG. 5, can specify that transactions be allocated entirely to either credit or debit. In this event, server 10, during processing transactions, determines if the transaction was a special transaction. If it were not designated "special", it would be treated as a credit transaction. If it were designated one of the special types of transactions, then it would be treated as deposit or credit as previously specified by the consumer. If it were designated special, and specified to be credit, it would be treated as a normal credit transaction. If it were designated special and specified to be a deposit transaction, then if there was enough in the checking account, above the specified minimum, to cover the amount of the transaction, it would be a deposit transaction. If for this case however, the transaction amount was greater than that available above the minimum balance in the checking account, then the remainder of the transaction would be split off as a credit transaction.

Additionally, regarding both FIGS. 7 and 8, as described above, the customer financial preference database 400 saves the user's selections as to whether certain types of transactions are allowed to draw on their checking account balance below the minimum level that he has specified.

Both operations depicted in FIGS. 6 and 7 are intended only as possible uses for consumer preferences when a consumer maintains several accounts at the same institution and is no way intended to limit the scope of the present invention. Any method of allocation of transaction costs between deposit and credit accounts used in conjunction with a credit interest rate reduction as a result of pledged or multiple qualifying accounts be held at a single institution is within the contemplation of the present invention.

As such, the present invention provides a system where a consumer could specify that cash advances would be taken from the deposit account thus avoiding high interest charges. The card issued by the bank that employs this system replaces (combines the functions of) not only the credit card and debit card, but also the "cash" card. In general, the function of the card would optimize money movement for the consumer automatically. This money management frees the consumer from the burden of moving money from account to account.

It should be noted that, although the operations of the system, including the reduction of interest rates based on the consumers qualified accounts and the ability of the account to maintain the functions of a deposit and credit account simultaneously have been illustrated separately in order to better illustrates the systems functions. However, this is in no way intended to limit the scope of the invention. For example a card issued to an account holder supported by this system can not only take advantage of the dual credit and deposit functions of the account but they can also utilize the added advantages of lower credit interest rates by way of additional qualifying or pledged accounts with the same lending institution. Additionally, a lending institution can limit the function of the account to provide either the reduced credit interest or the dual function purchasing functions or a combination thereof. Thus any similar system that provides analogous accounting procedures so as to provide comparable advantages as to purchasing flexibility and reduced credit interest is within the contemplation of the present invention.

Any financial advisor recommends pay down of credit card debt (high interest rate debt) prior to an addition to savings, or any other investment commitment, including investments in stocks, bonds or other securities. This system allows the consumer to benefit from this advice automatically. Additionally, the feature allowing the account holder to pledge deposited saving moneys as charge account security, offers to consumers yet another method to lower their credit interest rates while offering the issuing bank a means to attract loyal consumers.

What is claimed is:

1. A consumer financial transaction system provided by a lending institution enabling a consumer to make transactions via a transaction device, said system comprising:

a database storage device for maintaining a plurality of databases, said databases configured to store information corresponding to credit accounts held by each of said consumers with said lending institution;

said databases configured to store information corresponding to deposit accounts held by each of said consumers with said lending institution; and a server, said server maintaining a compute interest pledge module configured to calculate a credit interest rate corresponding to amounts in said deposit accounts maintained by said consumer with the lending institution, pledged by said consumer as a security against said consumer's credit account.

2. The consumer financial transaction system as claimed in claim 1, wherein said server is further configured to adjust said consumers credit limit in an account corresponding to an amount on deposit in said deposit account maintained by each consumer with the lending institution, pledged by said consumer as security against said consumer's credit account.

3. The consumer financial transaction system as claimed in claim 1, wherein said plurality of databases is comprised of customer financial relationship configured to store information pertaining to all of said consumer's accounts held at lending institution.

4. The consumer financial system as claimed in claim 3, wherein said system further comprises a means to denote a stored account in said financial relationship database as an account pledged in security of said consumer's credit account.

5. The consumer financial transaction system as claimed in claim 1, wherein said server further maintains a compute credit line module configured to compute said consumer's credit limit and base interest rate.

6. A consumer financial transaction method provided by a lending institution enabling a consumer to make transactions via a transaction device for use on a system, said method comprising the steps of:
  determining a first credit interest rate for a credit account owned by said consumer at said lending institution;
  determining amounts in pledged deposit accounts held by said consumer at said lending institution;
  determining a second credit interest rate for said consumer at said lending institution based upon said amounts pledged from said deposit accounts at said lending institution;
  applying the second credit interest rate to amounts in said credit account secured by said pledged amounts from said deposit accounts; and
  applying the first credit interest rate to amounts in said credit account that are not secured by pledged amounts from said deposit accounts.

7. The consumer financial transaction method as claimed in claim 6 further comprising the step of accessing said consumer's deposit accounts at said same lending institution.

8. The consumer financial transaction method as claimed in claim 7 further comprising the steps of determining the amounts pledged by said consumer from said deposit accounts that are considered by said lending institution when determining, said consumes credit limit; and increasing said consumer's credit limit based on said pledged amounts.

9. The consumer financial transaction method as claimed in claim 6 further comprising the steps of storing said pledged amounts from said deposit accounts into a customer financial relationship database.

10. The consumer financial transaction method as claimed in claim 9 further comprising the step of calculating a reduced credit interest rate for a consumer's credit account corresponding to the amounts pledged from said deposit accounts held by said consumer at said lending institution as listed in said customer financial relationship database.

11. The consumer financial transaction method as claimed in claim 9 further comprising the step of calculating an increased credit limit for a consumer's credit account corresponding to the pledged amounts from said deposit accounts held by said consumer at said lending institution as listed in said customer financial relationship database.

12. A consumer financial transaction system provided by a lending institution enabling a consumer to make transactions via a transaction device, said system comprising:
  a database storage device for maintaining a plurality of databases, said databases configured to store information corresponding to credit accounts held by each of said consumers with said lending institution;
  said databases also configured to store information corresponding to deposit accounts held by each of said consumers, with said lending institution;
  a compute interest pledge module configured to calculate a credit interest rate corresponding to amounts in said deposit accounts by said consumer with the lending institution, pledged by said consumer as security against said consumer's credit account; and
  a secondary transaction module, configured to apportion a withdrawal for a transaction between a consumer's credit account and any one of said consumer's deposit accounts maintained by said consumer with said lending institution.

13. A consumer financial transaction method provided by a lending institution enabling a consumer to make transactions via a transaction device for use on a system, said method comprising the steps of:
  determining the number of qualifying accounts and pledge accounts held by said consumer at said lending institution which are considered by said lending institution when determining said consumer's credit interest rates;
  determining a first credit interest rate for a credit account owned by said consumer at said lending institution;
  reducing said consumer's said first credit interest rate based on said qualifying accounts and said pledge accounts;
  determining amounts in pledged deposit accounts held by said consumer at said tending institution;
  determining a second credit interest rate for said consumer at said lending institution based upon said amounts in said deposit accounts, pledged by said consumer, at said lending institution;
  applying the second credit interest rate to amounts in said credit account secured by amounts in said pledged deposit accounts;
  applying the first credit interest rate to amounts in said credit account that are no secured by amounts in said pledged deposit accounts;
  storing said consumer preferences regarding how said system apportions a withdrawal for transactions between a consumer's credit accounts and deposit accounts; and
  allocating said withdrawals for said transactions between said consumer's credit and deposit accounts in accordance with said stored consumer preferences.

* * * * *